United States Patent
Kobashi

(10) Patent No.: US 7,868,882 B2
(45) Date of Patent: Jan. 11, 2011

(54) ELECTRONIC CIRCUIT, ELECTRO-OPTICAL DEVICE, AND ELECTRONIC APPARATUS INCLUDING THE SAME

(75) Inventor: Yutaka Kobashi, Mizuho (JP)

(73) Assignee: Sony Corporation, Tokyo (JP)

( * ) Notice: Subject to any disclaimer, the term of this patent is extended or adjusted under 35 U.S.C. 154(b) by 882 days.

(21) Appl. No.: 11/785,876

(22) Filed: Apr. 20, 2007

(65) Prior Publication Data
US 2007/0284509 A1  Dec. 13, 2007

(30) Foreign Application Priority Data
May 17, 2006  (JP) .............................. 2006-137410

(51) Int. Cl.
*G06F 3/038* (2006.01)
(52) U.S. Cl. ................ 345/207; 345/102; 250/214 AL; 250/214 R; 356/218
(58) Field of Classification Search ................ 345/101, 345/102, 207; 250/214 R, 206, 214 AL, 250/214 DC, 214 SW, 214 P; 356/218
See application file for complete search history.

(56) References Cited

U.S. PATENT DOCUMENTS

| | | | | |
|---|---|---|---|---|
| 5,023,704 | A | * | 6/1991 | Hieda et al. ............... 348/227.1 |
| 5,587,576 | A | * | 12/1996 | Maki ...................... 235/462.41 |
| 6,229,604 | B1 | | 5/2001 | Radziuk et al. |
| 7,268,337 | B2 | | 9/2007 | Ozawa |
| 2005/0218302 | A1 | * | 10/2005 | Shin et al. ................ 250/214 R |
| 2005/0219094 | A1 | * | 10/2005 | Murphy ....................... 341/133 |
| 2005/0269486 | A1 | * | 12/2005 | Ozawa .................... 250/214 R |

FOREIGN PATENT DOCUMENTS

| | | |
|---|---|---|
| JP | A-04-034519 | 2/1992 |
| JP | A-06-245152 | 9/1994 |
| JP | A-09-127556 | 5/1997 |
| JP | A-11-153485 | 6/1999 |
| JP | A-11-205247 | 7/1999 |
| JP | A-2005-345286 | 12/2005 |
| WO | WO 2006/117955 A1 | 11/2006 |

OTHER PUBLICATIONS

New U.S. Patent Application filed on Apr. 20, 2007 in the name of Yutaka Kobashi.

* cited by examiner

*Primary Examiner*—Lun-Yi Lao
(74) *Attorney, Agent, or Firm*—K&L Gates LLP

(57) ABSTRACT

An electronic circuit, which has transistors disposed on a substrate, each transistor including an active layer made of thin-film polysilicon, includes a sensor that converts a measured quantity into a current value, a current-voltage conversion circuit that converts the current value into a voltage, and a voltage detection circuit that detects the voltage converted by the current-voltage conversion circuit and outputs a predetermined signal. The current-voltage conversion circuit includes a storage circuit and a range-switching circuit that switches a current-voltage conversion range of the current-voltage conversion circuit by switching the capacitance of the storage circuit.

8 Claims, 11 Drawing Sheets

FIG. 7

< TABLE 1 (V1 = HIGH) >

| t | SET POINT |
|---|---|
| 0 | 255 |
| 1 | 255 |
| 2 | 254 |
| 3 | 254 |
| 4 | 253 |
| 5 | 253 |
| 6 | 253 |
| 7 | 252 |
| .... | |
| 254 | 190 |
| 255 | N/A |

< TABLE 2 (V1 = LOW) >

| t | SET POINT |
|---|---|
| 0 | N/A |
| 1 | 200 |
| 2 | 199 |
| 3 | 199 |
| 4 | 199 |
| 5 | 198 |
| 6 | 198 |
| 7 | 198 |
| .... | |
| 254 | 101 |
| 255 | 100 |

ELECTRONIC CIRCUIT, ELECTRO-OPTICAL DEVICE, AND ELECTRONIC APPARATUS INCLUDING THE SAME

BACKGROUND

1. Technical Field

The present invention relates to electronic circuits, electro-optical devices, and electronic apparatuses including the same. More particularly, the invention relates to a circuit formed on a substrate using a thin-film polysilicon deposition technique, a liquid crystal display device including the circuit, and an electronic apparatus including the liquid crystal display device.

2. Related Art

In recent years, a technology in which various thin-film transistor circuits are formed on glass substrates using a low-temperature polysilicon deposition technique, i.e., a System On Glass (SOG) technology, has been actively developed. Examples include a monolithic driver in which a driver circuit is integrated onto a glass substrate of a liquid crystal display.

As one application of the SOG technology, it is conceivable to form a sensor and its sensing circuit on a glass substrate. For example, by using a structure in which an optical sensor and a sensing circuit are integrated onto a transparent substrate constituting a liquid crystal display, and in which the state of external light is detected, and the illuminance of a backlight is controlled on the basis of the detected results, it is possible to maintain the optimal visibility of the liquid crystal display regardless of the environment. There are many other sensors, such as temperature sensors, gyro sensors, and inclination sensors, that benefit from being disposed on glass substrates. In general, outputs of these sensors are analog signals. In order to process the analog signals by a digital logic circuit disposed on a glass substrate so as to be used for proper control, it is necessary to convert the signals to digital form with an A/D conversion circuit.

FIG. 12 is a circuit diagram showing an example of an A/D conversion circuit of a known current device. In the current device (sensor 1), one end is connected to a power supply voltage VD, and the other end is connected via a Node-A, the voltage of which is VA, to a drain electrode and a gate electrode of a transistor 2. A source electrode of the transistor 2 is connected to a power supply voltage VS. The Node-A is connected to a comparator circuit 3.

In the current device, which is the sensor 1, a current Isense, which flows between the power supply voltage VD and the Node-A, changes according to the quantity of a physical stimulus to be sensed and a voltage (VD−VA) applied between the power supply voltage VD and the Node-A.

In the transistor 2, the voltage between the gate and the source is given by the equation Vgs=VA−VS and the voltage between the drain and the source is given by the equation Vds=VA−VS. Hence, Vds=Vgs. Therefore, if the threshold value Vth of the transistor 2 satisfies the relationship Vth>0, the relationship Vds>Vgs−Vth is satisfied. When Vth<VA−VS, the transistor 2 always operates in a saturation region. The characteristics of a general MOS transistor in the saturation region are expressed by equation (1).

$$Ids = \frac{W}{2L} \times \mu \times C0 \times (Vgs - Vth)^2 \quad (1)$$

Here, W is the channel width of the transistor, L is the channel length, μ is the mobility, and C0 is the gate capacitance.

From Kirchhoff's law, the relationship Isense=Ids is obvious. Hence, equation (2) is satisfied.

$$Isense = \frac{W}{2L} \times \mu \times C0 \times (Vgs - Vth)^2 \quad (2)$$

Equation (2) can be transformed into equation (3).

$$Vgs = \sqrt{\frac{Isense \times 2L}{W \times \mu \times C0}} + Vth \quad (3)$$

Since VA=Vgs+VS, equation (4) is derived.

$$VA = \sqrt{\frac{Isense \times 2L}{W \times \mu \times C0}} + Vth + VS \quad (4)$$

Assuming that the current Isense does not depend on the voltage VA, it is possible to easily obtain the current Isense from the voltage VA.

One example of a sensor device that satisfies the assumption is an optical sensor device which uses a PN junction diode or a PIN junction diode. When a reverse bias is applied to such a device, the current Isense is a constant current source which generates a current proportional to the light illuminance in a certain range. Hence, equation (5) is valid.

$$VA = \sqrt{\frac{2L \times Isense}{W \times \mu \times C0}} Vth + VS \quad (5)$$

That is, the current Isense is calculated from the voltage VA according to equation (6).

$$Isense = (VA - Vth - VS)^2 \times \frac{W \times \mu \times C0}{2L} \quad (6)$$

Here, the voltage VA of the Node-A is input to the comparator circuit 3. FIG. 13 is a circuit diagram showing a configuration of the comparator circuit 3. This circuit compares the input voltage Vin with the reference voltage Vref. If Vin(=VA)>Vref, the circuit outputs a High voltage (≈VD) to an output signal Out. If Vin(=VA)<Vref, the circuit outputs a Low voltage (≈VS) to the output signal Out. Therefore, when the reference voltage Vref is applied to the comparator circuit 3, by referring to the digital output result of the terminal of the output signal OUT, it is possible to find out whether the voltage VA is higher or lower than the reference voltage Vref. In such a case, when digital conversion is desired in 256 gradations, 255 comparator circuits 3 are arranged in parallel, and different reference voltages Vref are applied thereto. Alternatively, it is possible to perform conversion in the same manner by inputting a staircase waveform (255 STEP) to the reference voltage Vref, and by storing the output results. Which method is to be selected may be determined depending on the circuit area, power consumption, and sampling rate. Furthermore, it is of course possible to employ a configuration in which both methods are combined. Namely, it is possible to perform digital conversion in 256 gradations by inputting 16 staircase waveforms (15 STEP) having different levels into 16 corresponding comparators.

Furthermore, in the circuit shown in FIG. 13, preferably, transistors 3a, 3b, 3c, and 3d have the same size. For example, in each of the transistors 3a, 3b, 3c, and 3d, the channel width W is set at 10 μm, and the channel length is set at 6 μm.

Since the voltage VA is determined in a certain range as described above, by using equation (6), it is possible to determine the current Isense, which gives the physical quantity to be determined, for example, illuminance. That is, the output of the sensor can be A/D converted.

Furthermore, even in a sensor in which the current Isense of the sensor 1 is not constant and is a function of the voltage (VD−VA), A/D conversion can be performed using the same electronic circuit. For example, in a sensor device having a certain impedance Rsense that depends on a measured quantity, the current Isense is expressed by equation (7).

$$Isense = \frac{(VD - VA)}{Rsense} \quad (7)$$

Examples of such a device include a temperature sensor including a resistor, and a gyro sensor including a variable resistor. A sensor is taken as an example, in which the impedance Rsense varies with temperature according to equation (8).

$$Rsense = R0 \times \exp\left(\frac{B}{T}\right) \quad (8)$$

Here, T is the absolute temperature (K), and R0 and B are characteristic constants of the temperature sensor.

The following equation (9) is obtained from equations (4) and (7).

$$VA = \sqrt{\frac{2L \times (VD - VA)}{Rsense \times W \times \mu \times C0}} + Vth + VS \quad (9)$$

The above equation is solved to give equation (10).

$$Rsense = \frac{2L \times (VD - VA)}{W \times \mu \times C0 \times (VA - Vth - VS)^2} \quad (10)$$

Thus, the impedance Rsense is calculated from the voltage VA. By substituting the resulting value into equation (8), the temperature T is obtained.

However, in general, characteristics, in particular, saturation characteristics, of polysilicon thin-film transistors are inferior to those of MOS transistors which are formed on single-crystal silicon substrates. Therefore, polysilicon thin-film transistors have a problem in that the dynamic range where A/D conversion is possible is significantly narrow.

FIG. 14 is a graph showing output characteristics of transistors. A curve (A) indicates output characteristics of a MOS device formed on a single-crystal silicon device, and a curve (B) indicates output characteristics of a polysilicon thin-film transistor device. Substantially horizontal portions on the curves (A) and (B) each correspond to a saturation region which satisfies equation (1) and in which Vgs>Vth and Vgs−Vth<Vds<Vkink, where Vkink is the voltage at which a kink phenomenon starts to occur. The region in which Vds>Vkink, does not satisfy equation (1). In the MOS device formed on the single-crystal silicon device, Vkink is high and equation (1) is satisfied in a relatively wide range. (That is, the horizontal portion on the curve is large.) Consequently, the range of the current Isense that can be derived from equation (6) is relatively large.

For example, in a device with a Vkink of 10 V, Vds(=VA−VS) must be less than 10 V. Assuming that the channel width W is 10 μm, the channel length L is 6 μm, the mobility is 1,300 cm²/V/S, and the thickness of the gate oxide film is 100 nm, Isense is calculated to be less than about 3 mA from equation (4). With respect to the lower limit, theoretically, when Vgs→Vth(Va→Vth−Vs), Ids→0. However, in practice, since a slight leakage current always flows, even if Vgs→Vth, Ids→Ileak, and no change is observed in a range lower than a certain level. Furthermore, in practice, taking the maximum range ΔVth of production variation of the threshold voltage Vth into account, VA must be approximately equal to or greater than ΔVth−VS. In consideration of all of the above, at Isense greater than about 1 nA, which is practical, and in a MOS device formed on a single-crystal device, it is possible to perform A/D conversion in an Isense range of 1 nA to 3 mA using the structure shown in FIG. 12. That is, the measurement dynamic range is about 3,000,000:1. Furthermore, in order to shift the range to the lower current side, the channel width W of the transistor 2 is decreased (or the channel length L is increased). In order to shift the range to the higher current side, the channel width W of the transistor 2 is increased (or the channel length L is decreased). In either case, the dynamic range does not change.

However, in a polysilicon thin-film transistor, in particular, in a low-temperature polysilicon (LTPS) thin-film transistor which is formed by a low-temperature process at 600° C. or lower, the mobility is about 100 cm²/V/S, and the kink voltage is low. A kink phenomenon starts to occur at a Vkink of about 6 V. Furthermore, the off-leak current is increased, and when Vds=Vgs=Vth, Ileak is about 10 nA (W=10 μm and L=6 μm). The maximum range ΔVth is also large being from several tens of millivolts to about 200 mV. The calculations performed in the same manner as above show that the measurable current range is 10 nA to 80 μA in terms of the current Isense, and the dynamic range is about 8,000:1, which is considerably lower than that of the MOS transistor.

As described above, in the A/D conversion circuit including polysilicon thin-film transistors, it is not possible to obtain a sufficient A/D conversion dynamic range compared with the case in which MOS transistors on a single-crystal silicon device are used, which is a problem.

JP-A-6-245152 is an example of related art.

SUMMARY

An advantage of some aspects of the invention is that an A/D conversion circuit including polysilicon thin-film transistors is provided in which a sufficient A/D conversion dynamic range can be obtained and which is suitable for polysilicon thin-film transistors.

An aspect of the invention relates to an electronic circuit having transistors disposed on a substrate, each transistor including an active layer made of thin-film polysilicon, the electronic circuit including a sensor that converts a measured quantity into a current value, a current-voltage conversion circuit that converts the current value into a voltage, and a voltage detection circuit that detects the voltage converted by the current-voltage conversion circuit and outputs a predetermined signal, wherein the current-voltage conversion circuit includes a storage circuit and a range-switching circuit that switches a current-voltage conversion range of the current-voltage conversion circuit by switching the capacitance of the storage circuit.

In such a structure, since the measurement range can be switched by the range-switching circuit, even in a circuit including field-effect transistors, each including an active layer made of thin-film polysilicon, it is possible to secure a sufficient A/D conversion dynamic range.

In the electronic circuit, according to the above aspect of the invention, preferably, any one of the following structures is used: a structure in which the storage circuit includes a first capacitive element and a second capacitive element, and either one or both of the first capacitive element and the second capacitive element are electrically connected to the sensor in response to a range-switching signal; a structure in which the storage circuit includes the first capacitive element, the second capacitive element, and a first switching element, and the first switching element writes a reset voltage into the first capacitive element at an appropriate timing, and the reset voltage changes in response to the range-switching signal; and a structure in which the storage circuit includes a capacitive transistor having an active layer made of thin-film polysilicon, the range-switching signal is connected to a source electrode and a drain electrode of the capacitive transistor, and an end of the sensor is connected to a gate electrode of the capacitive transistor. In such a structure, it is possible to realize the switching of the range by means of a simple circuit configuration.

Furthermore, in the electronic circuit, preferably, the sensor is a PIN junction diode or a PN junction diode including an active layer made of thin-film polysilicon, the active layer being the same layer as the active layer of the capacitive transistor, and the measured quantity corresponds to a light illuminance. In such a structure, it is possible to measure the illuminance of light with which the substrate is irradiated without an increase in cost. For example, when the electronic circuit is applied to a display device, it is possible to maintain optimal display quality in response to external light.

Furthermore, in the electronic circuit, preferably, the sensor is a resistor including the thin-film polysilicon which is the same as that for the active layer of the capacitive transistor, and the measured quantity corresponds to a temperature. In such a structure, it is possible to measure the temperature of the substrate without an increase in cost. For example, when the electronic circuit is applied to a display device, it is possible to control gradations optimally so that optimal display quality is maintained in response to temperature.

Furthermore, in the electronic circuit, preferably, the voltage detection circuit includes a plurality of comparator circuits having the same circuit configuration, and different reference voltages are applied to the comparator circuits. Alternatively, preferably, the voltage detection circuit includes a plurality of CMOS inverters having different ratios of the channel width of an N-channel transistor to the channel width of a P-channel transistor. In such a structure, it is possible to further increase the dynamic range in which A/D conversion can be performed.

Other aspects of the invention relate to an electro-optical device including any of the electronic circuits described above and an electronic apparatus including the electro-optical device. In such a structure, since an A/D conversion circuit can be formed on a glass substrate in the same manufacturing step as an active matrix, it is possible to manufacture an electro-optical device with a built-in sensor at low cost. By incorporating the electro-optical device into an electronic apparatus, it is possible to manufacture a multifunctional electronic apparatus excellent in display quality at lower cost. Furthermore, since the freedom with which the sensor can be arranged is enhanced, the overall dimensions can be reduced, and it is possible to manufacture an electronic apparatus with excellent design properties, which is also advantageous.

BRIEF DESCRIPTION OF THE DRAWINGS

The invention will be described with reference to the accompanying drawings, wherein like numbers reference like elements.

FIG. 7 shows an example of look-up tables according to the first embodiment.

DESCRIPTION OF EXEMPLARY EMBODIMENTS

Preferred embodiments of the invention will be described below in detail with reference to the drawings.

First Embodiment

Figure 1:
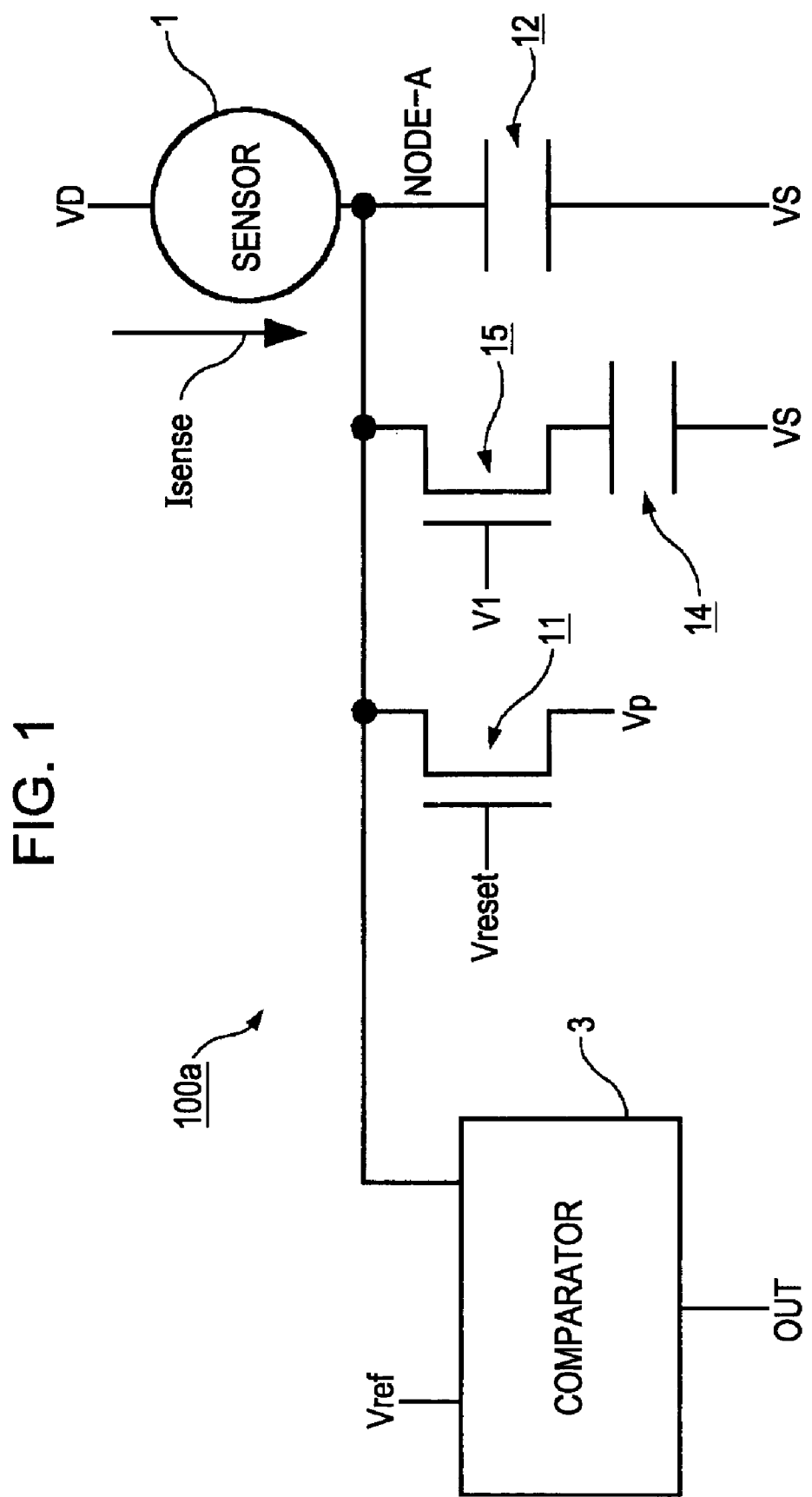
FIG. 1 is a circuit diagram showing a sensor and an A/D conversion circuit according to a first embodiment of the invention.
Figure 12:
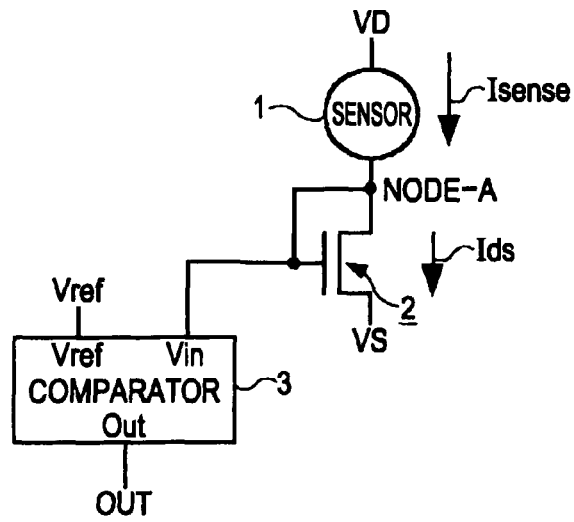
FIG. 12 is a circuit diagram showing a sensor and an A/D conversion circuit according to a known example.

FIG. 1 is a diagram showing a sensor 1 and an A/D conversion circuit 100a realizing an electronic circuit in accordance with a first embodiment of the present invention. Elements that are the same as those of the known structure shown in FIG. 12 are designated by the same reference numerals, and a description thereof is omitted. In this circuit, a transistor is not used for conversion of the current Isense and the voltage VA, and a capacitor 12 serving as a first capacitive element and a capacitor 14 serving as a second capacitive element are placed. A transistor 15 serving as a range-switching circuit, a transistor 11 serving as a first switching element, and transistors constituting a comparator circuit 3 serving as a voltage detection circuit are field-effect transistors each including an active layer made of thin-film polysilicon disposed on a glass substrate serving as a substrate.

The capacitor 12, the capacitor 14, the transistor 15 and the transistor 11 constitute a current-voltage conversion circuit that converts the output from the sensor 1 into a voltage corresponding to the current value. The transistor 15 constitutes a range-switching circuit that switches the current-voltage conversion range (measurement range) of the current-voltage conversion circuit.

As shown in FIG. 1, the capacitor 12 and the capacitor 14 connected in series to the transistor 15 are connected in parallel between a Node-A and a power supply voltage VS. A range-switching signal V1 for switching the current-voltage conversion range is connected to a gate electrode of the transistor 15.

Here, the capacitance C12 of the capacitor 12 is 100 fF, and the capacitance C14 of the capacitor 14 is 9.9 pF. VD and VS are power supply voltages applied from external sources. For example, VD=8 V and VS=0 V. Each of the transistor 11 and the transistor 15 is an N-channel field-effect transistor including an active layer made of thin-film polysilicon, in which the channel width W is 20 μm and the channel length L is 6 μm.

The range-switching signal V1 is either the power supply voltage VD or the power supply voltage VS. When V1=VD, the transistor 15 is ON, and the capacitance connected to the Node-A corresponds to C12+C14=10 pF. When V1=VS, the transistor 15 is OFF, and the capacitance connected to the Node-A corresponds to C12=100 fF.

Vreset is a voltage reset signal. Before measurement, the voltage reset signal Vreset is equal to the power supply voltage VD, and when the transistor 11 is ON, an initial voltage Vp is written in the voltage VA of the Node-A. The initial voltage Vp is lower than the reference voltage Vref. Here, for example, Vref=4 V and Vp=3 V.

At time t0, when the voltage reset signal Vreset is equal to the power supply voltage VS, the transistor 11 is OFF. After this, at time t>t0, a current Isense flows in the sensor 1 according to the measured quantity, and the voltage VA approaches the power supply voltage VD. Consequently, the voltage VA is a function of time t and can be represented by equation (11).

$$VA(t) = Vp + \frac{1}{C1}\int_{t0}^{t} Isense \, dt \qquad (11)$$

Here, C1 is the capacitance connected to the Node-A. As described above, when V1=VD, C1=C12+C14=10 pF. When V1=VS, C1=C12=100 fF.

In this embodiment of the invention, the sensor 1 is an optical sensor device including a lateral PIN junction diode having an active layer made of thin-film polysilicon manufactured in the same step as the transistors 11 and 15. Here, a cathode electrode is connected to the power supply voltage VD, and an anode electrode is connected to the Node-A. The sensor 1 is always used in a reverse bias state. In this case, in the sensor 1, a constant current source is set up, the constant current source depending only on illuminance under a certain voltage (VD-VA) condition. Thus, equation (12) is satisfied.

$$VA(t) = Vp + \frac{Isense \times (t - t0)}{C1} \qquad (12)$$

However, when the power supply voltage VD and the voltage VA are extremely close to each other, the assumption of the constant current source is not correct. Since the sensor 1 is used under the relationship Vp<VA(t)<Vref, it is required that the reference voltage Vref is not increased excessively.

Here, the Note-A is connected to the comparator circuit 3. Comparison is made between the voltage VA(t) and the reference voltage Vref. When Vref>VA(t), a low voltage (≈VS) is output. When Vref<VA(t), a high voltage (≈VD) is output. Additionally, the comparator-circuit 3 may have the same configuration as that of the known example shown in FIG. 13, or may have a configuration shown in FIG. 2 or 3.

Figure 2:
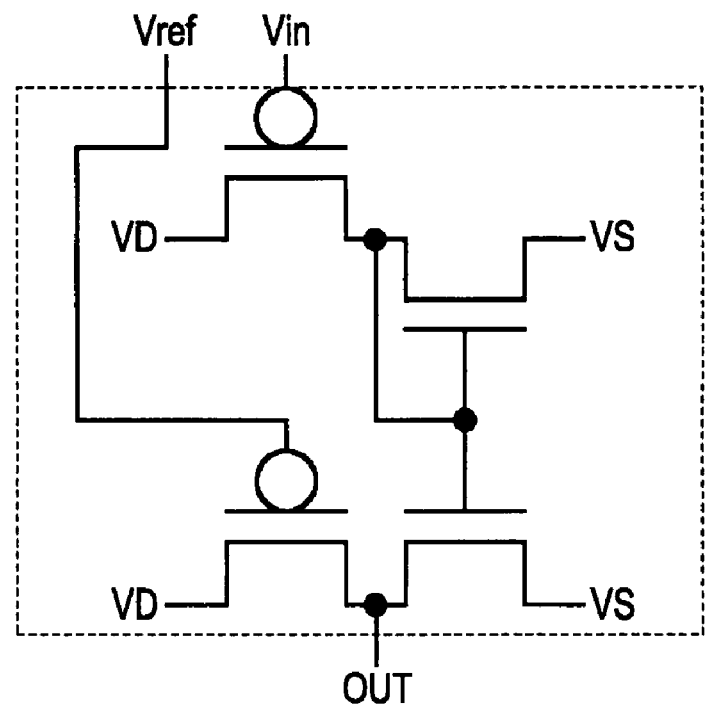
FIG. 2 is a detailed circuit diagram of a comparator circuit according to an example of the first embodiment.
Figure 3:
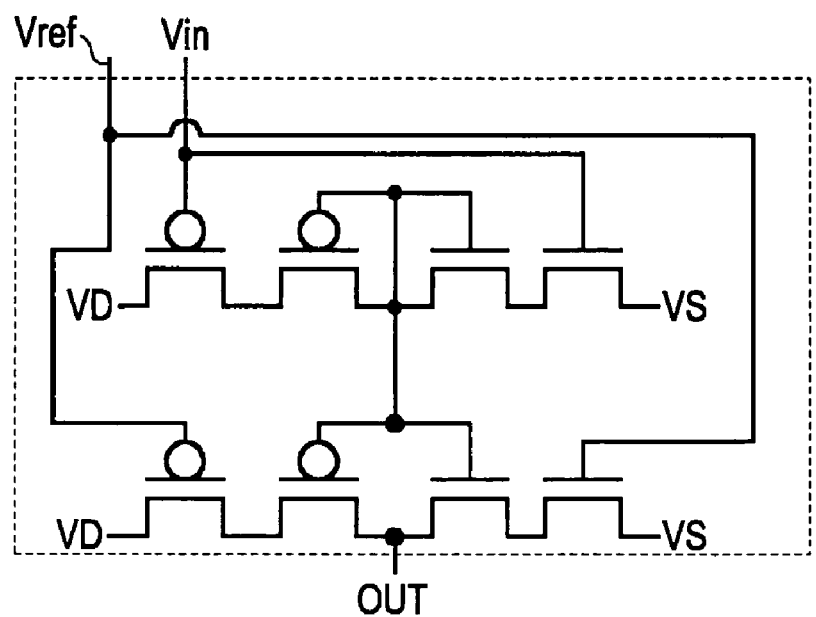
FIG. 3 is a detailed circuit diagram of a comparator circuit according to another example of the first embodiment.
Figure 13:
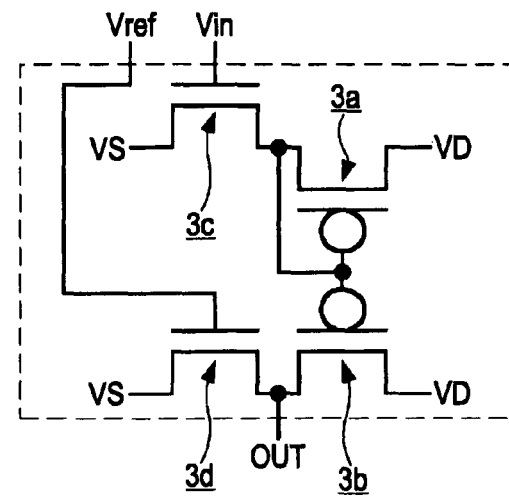
FIG. 13 is a detailed circuit diagram of a known comparator circuit.
Figure 14:
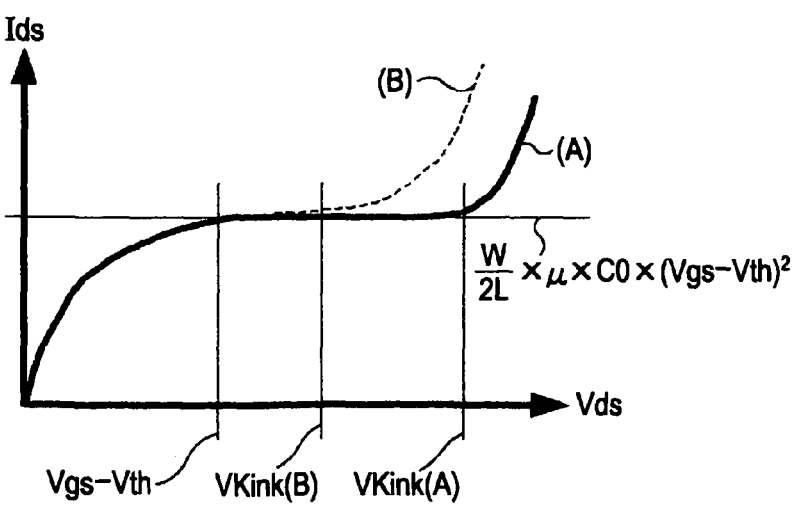
FIG. 14 is a graph showing output characteristics of a known transistor.

In the configuration shown in FIG. 2, Nch and Pch are reversed in TFTs compared with the configuration shown in FIG. 13. The configuration shown in FIG. 13 is suitable when the reference voltage Vref is closer to the power supply voltage VS, and the configuration shown in FIG. 2 is suitable when the reference voltage Vref is closer to the power supply voltage VD. Meanwhile, in a configuration shown in FIG. 3, although the number of elements is large and the circuit area is large, the range of the reference voltage Vref that can be operable is wider than the configuration shown in FIG. 13 or 2. Furthermore, a configuration is also conceivable in which a constant current source (e.g., a transistor in which a bias voltage is applied to a gate) is connected in series to the power supply voltage VD or the power supply voltage VS in the configuration shown in FIG. 13 or 2 so as to increase the operating margin. The most suitable comparator may be selected by a trade-off between the area, operating margin, and the like.

In equation (12), at inversion time t' where VA(t)=Vref, the output signal OUT inverts. Consequently, if the inversion time t' at which the voltage of the output signal OUT inverts is determined, it is possible to determine the current Isense from equation (13).

$$Isense = \frac{C1 \times (Vref - Vp)}{t' - t0} \qquad (13)$$

Here, the period t'−t0 cannot be increased infinitely. The reason for this is that if the period t'−t0 increases, one sensing period of the sensor 1 increases, and the period t'−t0 must be shorter than a predetermined period. This embodiment relates to an illuminance sensor circuit to be built in a liquid crystal display device. Since prompt feedback is required when there is a change in the illuminance of external light, the period t'−t0 is limited to less than 1/10 seconds.

The period t'−t0 cannot be decreased infinitely. The reason for this is that the operating speed of the comparator circuit 3 is finite, and the circuit which processes the output from the comparator circuit 3 also requires a certain processing time. In this embodiment, the period t'−t0 is limited to greater than 10 μs. Furthermore, since the relationship VD>>Vref>Vp>VS must be satisfied, it is not possible to greatly change the value Vref−Vp.

When calculations are made on the basis of the limitations described above, under the mode in which V1=VS, the measurable range of the current Isense is from 1 pA to 10 nA. That is, the measurement dynamic range is 10,000:1, which is substantially the same as the result of the thin-film transistor in the known example. However, by switching the mode to V1=VD, the current Isense can be measured in a range of 100 pA to 10 pA. When the ranges in both modes are combined, the measurable Isense range is from 1 pA to 10 μA. That is, the measurement dynamic range can be increased to 10,000,000: 1.

Figure 4A:
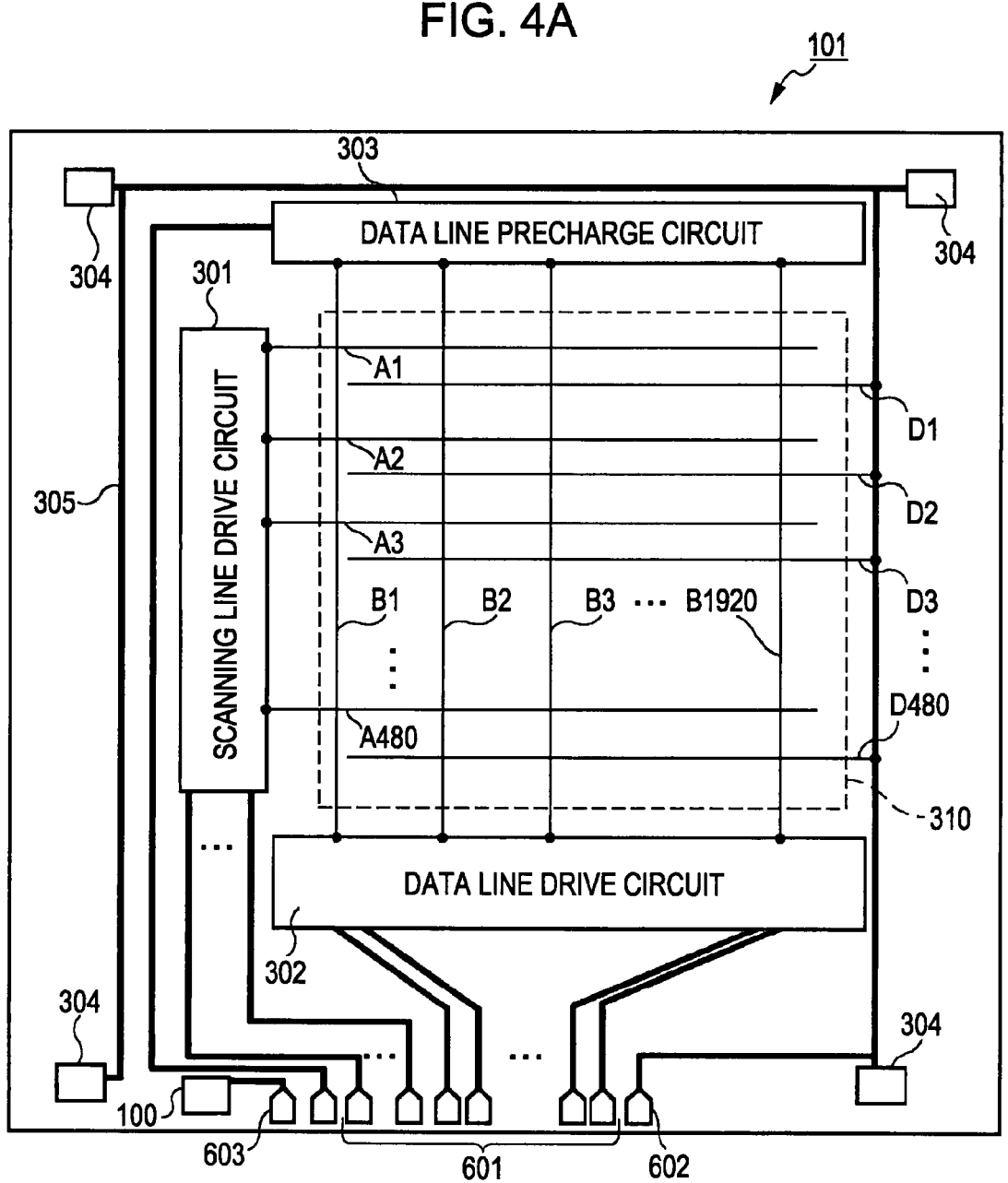
FIG. 4A is a diagram showing an active matrix substrate of a liquid crystal display device according to the first embodiment.

FIG. 4A is a diagram showing an active matrix substrate 101 for a transmissive-mode VGA-resolution liquid crystal display device for realizing an electro-optical device according to the first embodiment of the invention. On the active matrix substrate 101, 480 scanning lines A1 to A480 and 1,920 data lines B1 to B1920 are disposed so as to be orthogonal to each other, and 480 capacitor lines D1 to D480 are arranged in parallel and alternately with the scanning lines A1 to A480. The capacitor lines D1 to D480 are short-circuited with each other and connected to a common voltage input terminal 602. Conducting portions 304 are also connected to the common voltage input terminal 602. The sensor 1 and the A/D conversion circuit 100*a* shown in FIG. 1 are also disposed on the active matrix substrate 101, and the output signal OUT is connected to an output terminal 603 so that an output is produced in response to the illuminance of external light.

Figure 4B:
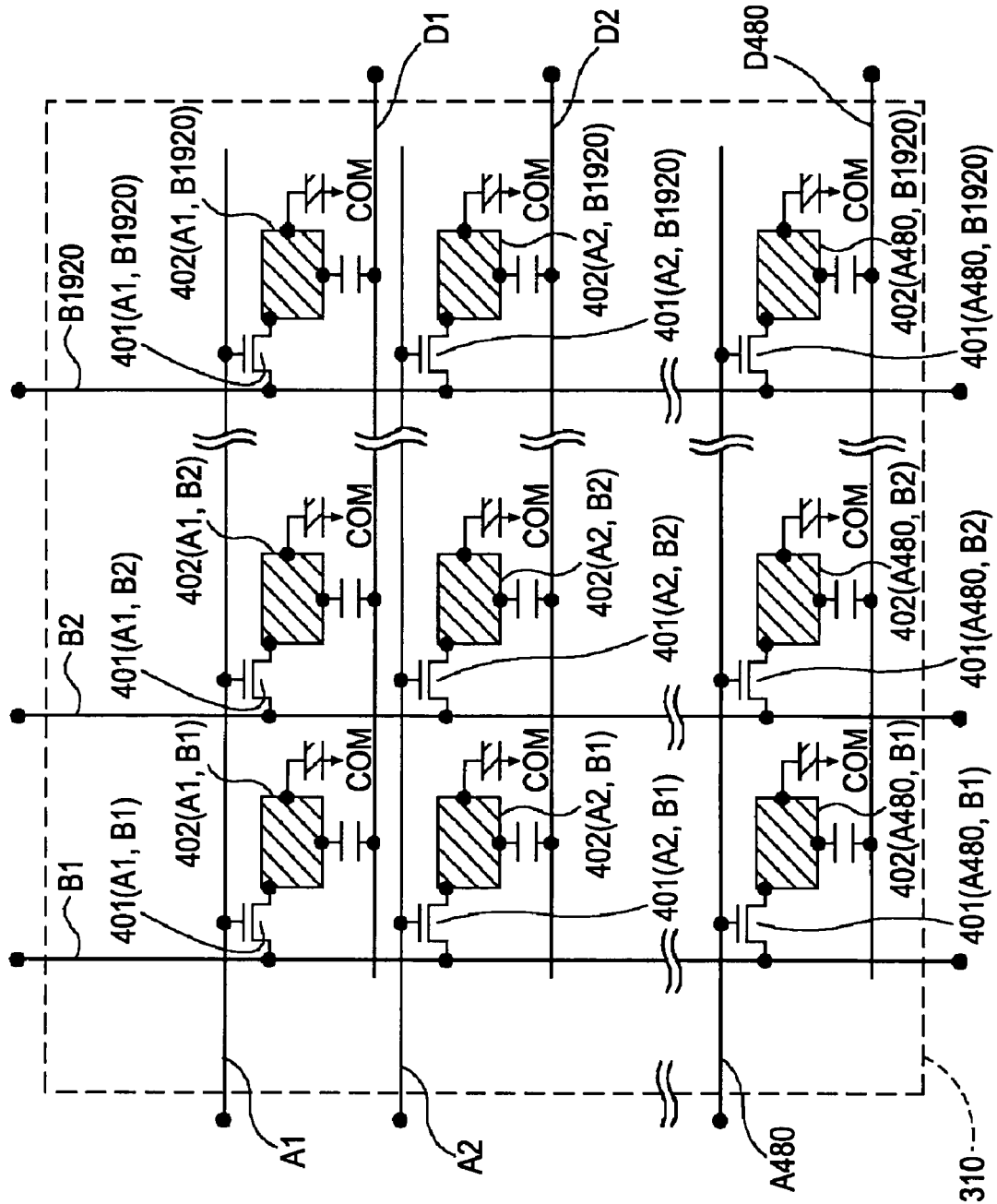
FIG. 4B is an enlarged diagram of a section surrounded by a dotted line in FIG. 4A.

FIG. 4B is an enlarged diagram of a section 310 surrounded by a dotted line in FIG. 4A. At an intersection of each of scanning lines An (where n is an integer satisfying the relationship 1≦n≦480) and each of data lines Bm (m is an integer satisfying the relationship 1<m≦1,920), a pixel switching element 401 (An,Bm) including an N-channel field-effect transistor made of thin-film polysilicon is disposed. A gate electrode thereof is connected to the scanning line An, and a source electrode and a drain electrode thereof are connected to the data line Bm and a pixel electrode 402 (An,Bm), respectively. A pixel electrode 402 (An,Bm) and a capacitor line Dn form an auxiliary capacitor, and when the active matrix substrate 101 is assembled as a liquid crystal display device, the pixel electrode 402 (An,Bm) and a counter substrate electrode (common electrode) form a capacitor with a liquid crystal element therebetween. Here, the transistor 2, the transistor 4, the transistor 5, transistors constituting the comparator circuits 31 to 38, and pixel switching elements 401 (An,Bm) are manufactured in the same step.

The scanning lines A1 to A480 are connected to a scanning line drive circuit 301, from which driving signals are supplied. The data lines B1 to B1920 are connected to a data line drive circuit 302 and a data line precharge circuit 303, from which image signals and precharge voltages are respectively supplied. The scanning line drive circuit 301, the data line drive circuit 302, and the data line precharge circuit 303 are connected to signal input terminals 601, from which necessary signals and power supply voltages are supplied. The scanning line drive circuit 301, the data line drive circuit 302, the data line precharge circuit 303 are formed by integrating polysilicon thin-film transistors on the active matrix substrate, and are manufactured in the same step as the pixel switching elements 401 (An,Bm), thus constituting a drive circuit built-in liquid crystal display device.

Figure 5:
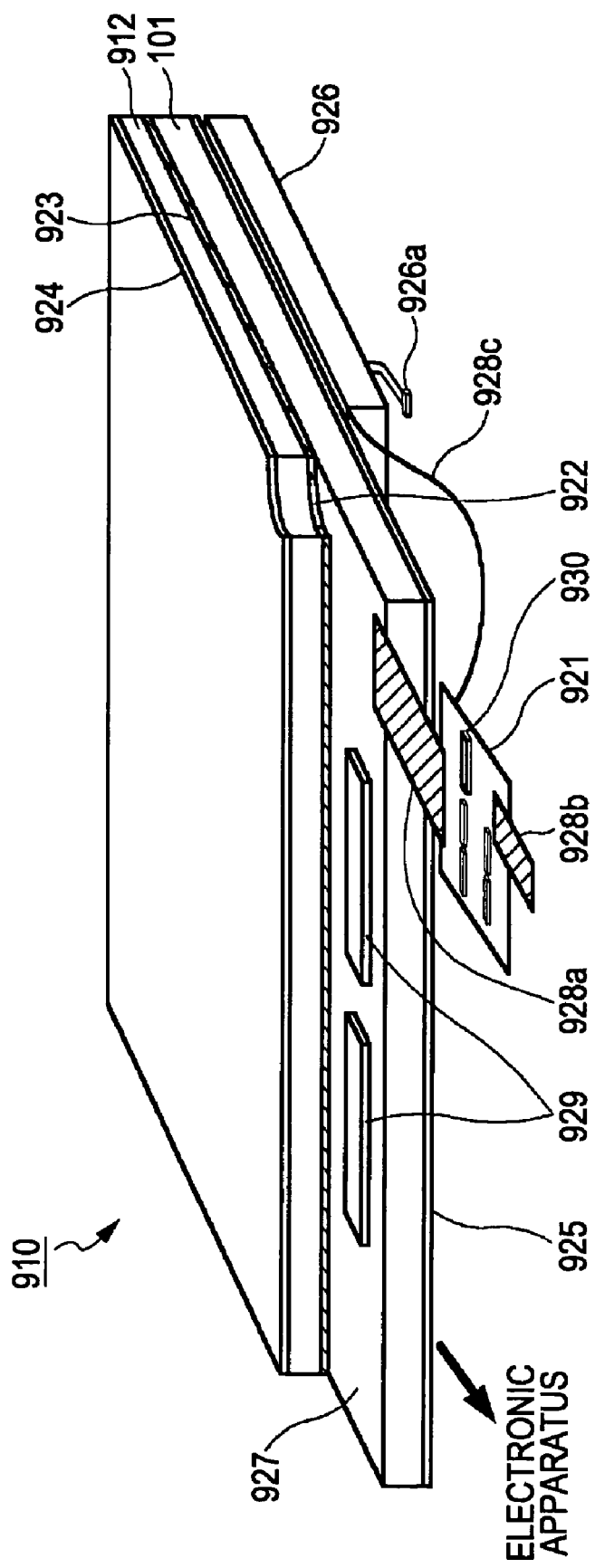
FIG. 5 is a perspective schematic view of the liquid crystal display device according to the first embodiment.

FIG. 5 is a perspective schematic view (partially sectional view) of a transmissive-mode VGA-resolution liquid crystal display device including the active matrix substrate shown in FIGS. 4A and 4B according to the first embodiment. In a liquid crystal display device 910, a liquid crystal material 922 having a nematic phase is interposed between the active matrix substrate 101 (first substrate) and a counter substrate 912 (second substrate). The active matrix substrate 101 and the counter substrate 912 are bonded with each other with a sealing material 923 to enclose the liquid crystal material 922. Although not shown in the drawing, an alignment film is disposed over the pixel electrodes of the active matrix substrate 101, the alignment film being formed by coating of an alignment material composed of polyimide or the like and subjected to rubbing treatment. Furthermore, although not shown in the drawing, the counter substrate 912 is provided with color filters corresponding to the pixels, a black matrix that prevents light leakage and improves contrast, and a counter electrode composed of an ITO film to which a common voltage is applied. An alignment material composed of polyimide or the like is applied by coating on a surface, which is in contact with the liquid crystal material 922, of the counter substrate 912, and the resulting alignment film is subjected to rubbing treatment in a direction which is orthogonal to the rubbing treatment direction of the alignment film of the active matrix substrate 101.

Furthermore, an upper polarizer 924 is disposed on the outer surface of the counter substrate 912, and a lower polarizer 925 is disposed on the outer surface of the active matrix substrate 101. The upper polarizer 924 and the lower polarizer 925 are arranged such that the polarization directions are orthogonal to each other (in a cross-Nicol configuration). Furthermore, a backlight unit 926, which is a surface illuminant, is disposed under the lower polarizer 925. The backlight unit 926 may have a structure in which a light guide plate or a diffusion plate is fixed on a cold-cathode tube or an LED, or may be a unit that emits light from the entire surface by means of EL elements. The backlight unit 926 is connected via a connector 926*a* to an electronic apparatus body, and power is supplied. Although not shown in the drawing, according to need, an outer shell may be provided. Alternatively, a protective glass or acrylic plate may be mounted further on the upper polarizer 924, or an optically compensating film may be attached in order to improve the viewing angle.

Furthermore, the active matrix substrate 101 has an extended section 927 protruding form the counter substrate 912. A flexible substrate FPC928*a* and an external driver IC929 are mounted on the signal input terminals 601, the common voltage input terminal 602, and the output terminal 603 (refer to FIG. 4A) which lie on the extended section 927, and a plurality of signal input terminals on the active matrix substrate 101 are electrically connected thereto. In the example shown in FIG. 5, two ICs constitute the external driver IC929, but one or three or more ICs may constitute the external driver IC929. The flexible substrate FPC928*a* is connected to a control substrate 921 provided with a power supply IC, a signal control IC, a capacitor, a resistor, ROM, a backlight control unit 930, etc., so that reference voltages, control signals, and image data are supplied to the active matrix substrate 101. The control substrate 921 is also connected via a connector 928*c* to the backlight unit 926, and the backlight control unit 930 on the control substrate 921 enables ON/OFF control and brightness adjustment of the backlight unit 926.

The control substrate 921 inputs via the flexible substrate FPC928*a* the output signal OUT of the sensor 1 and the A/D conversion circuit 100*a* that is output from the output terminal 603. Similarly, the control substrate 921 outputs range-switching signals V1 via the flexible substrate FPC928*a* to the sensor 1 and the A/D conversion circuit 100*a*, and thus the measurement range of the sensor 1 and the A/D conversion circuit 100*a* can be switched. Since the output signal OUT changes in response to the external illuminance, the backlight control unit 930 on the control substrate 921 adjusts the brightness of the backlight unit 926 or turns ON/OFF the backlight unit 926 on the basis of the signals, and thus the backlight unit 926 can be controlled such that optimal visibility is set according to external light.

Figure 6:
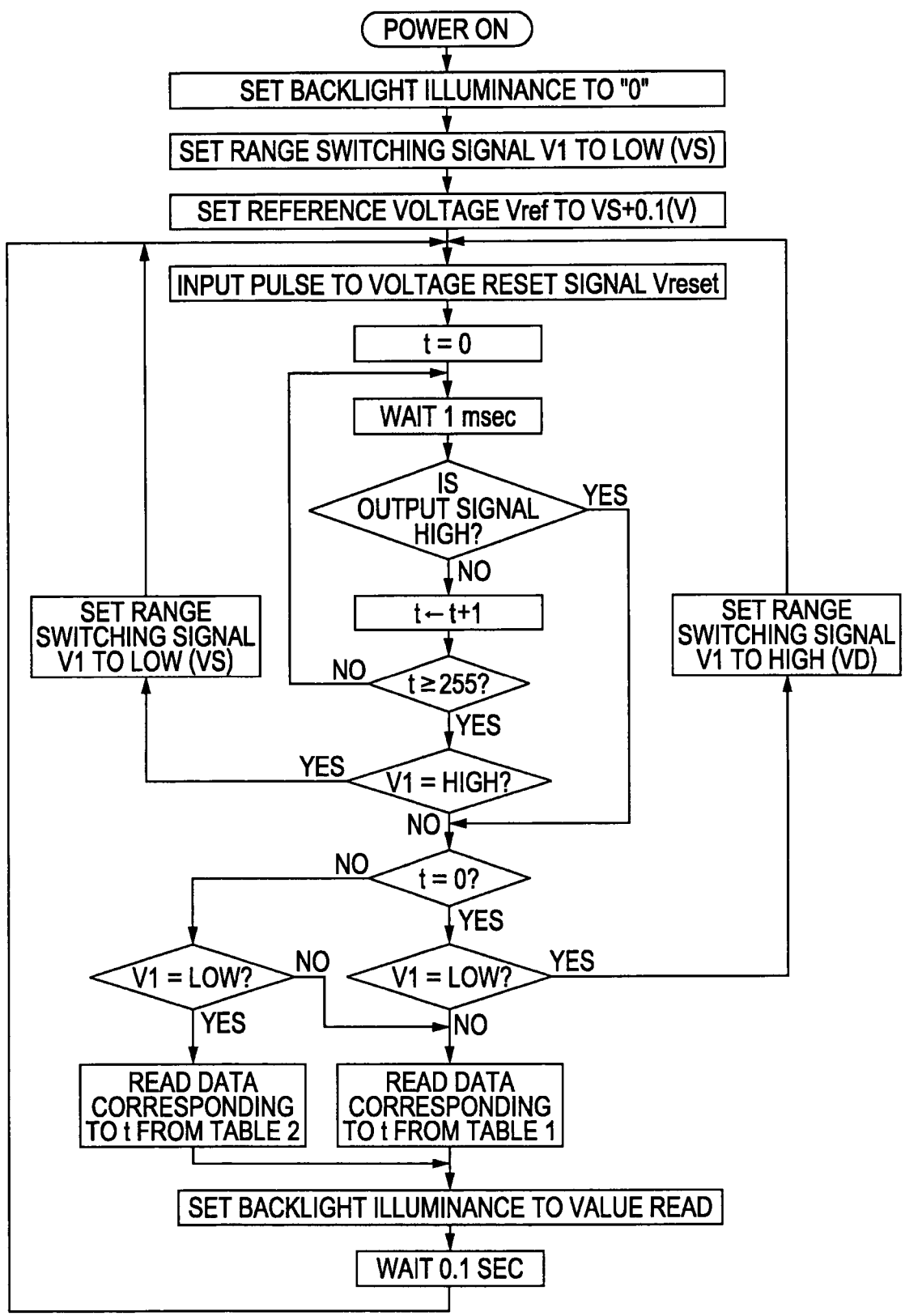
FIG. 6 is a flowchart showing an example of a backlight control algorithm of a backlight control unit according to the first embodiment.

A specific backlight control algorithm of the backlight control unit 930 is shown in FIG. 6. The brightness control signals sent from the backlight control unit 930 to the backlight unit 926 constitute 1 byte of data (0 to 255). When the control signal is 255, the brightness is maximum. When the control signal is 0, the backlight is off. First, the backlight control unit 930 sets V1 to be equal to VS and reads data of output signal OUT. If the output signal OUT is High (VD), V1 is switched to VD, and reading is performed again. After switching, if the output signal OUT is Low (VS), V1 is again switched to VS. The output signal OUT is read by switching the range in such a manner. With reference to the look-up tables shown in FIG. 7, the set point is read on the basis of the status of the output signal OUT and the range-switching signal V1, and the backlight illuminance is set to the set point read. In this algorithm, such an operation is repeated every 0.1 seconds. The look-up tables shown in FIG. 7 are arranged such that when the illuminance is very low (substantially equal to the threshold detectivity of the sensor 1), the backlight is turned on at a certain illuminance so as to prevent glare; and as the brightness increases, the illuminance is increased so as to prevent visibility from being affected by external light. Since the lower limit of the range in the case where V1=VD overlaps with the upper limit of the range in the case where V1=VS, the set points overlap. Since the transmissive-mode liquid crystal display device is taken as an example in this embodiment, the backlight illuminance is set so as to flatly increase with external light. However, in the case of a transflective-mode liquid crystal display device, when the brightness of external light increases to such an extent that satisfactory visibility is obtained only by the reflective mode, the backlight is turned off (setting=0).

In this embodiment, a structure has been described in which external illuminance is measured by the sensor 1, and the backlight brightness is automatically adjusted. However, in accordance with other embodiments of the invention, various sensors may be integrated onto substrates, such as a structure in which a temperature sensor is integrated onto a substrate, and by controlling the temperature dependency of liquid crystal or backlight, optimal display characteristics are always obtained. For example, in the case where a temperature sensor in which the impedance changes with temperature is built in as expressed by equation (8), equation (14) is used instead of equation (12).

$$VA(t) = Vp + \frac{1}{C1} \int_{t0}^{t} \frac{(VD - VA(t))}{Rsense} dt \quad (14)$$

Here, the impedance Rsense is a resistance determined by the measured quantity (temperature) of the sensor 1.

This integral equation is solved, and equation (15) is obtained from the condition that VA(t')=Vref at inversion time t'.

$$Rsense = \frac{t' - t0}{C1 \times \log\frac{VD - VS}{VD - Vref}} \quad (15)$$

Consequently, the impedance Rsense of the sensor 1 can be easily-obtained from the inversion time, and the temperature can be easily calculated therefrom.

When equations (13) and (15) are used, C1 is required. In the case where there is a variation in C1 in the manufacturing process, calibration is performed in advance, an Isense-t' or Rsense-t' conversion table on the basis of equations (13) and (15) is separately written into the module by EPROM or the like, and the table is referred to when conversion is performed.

Figure 8:
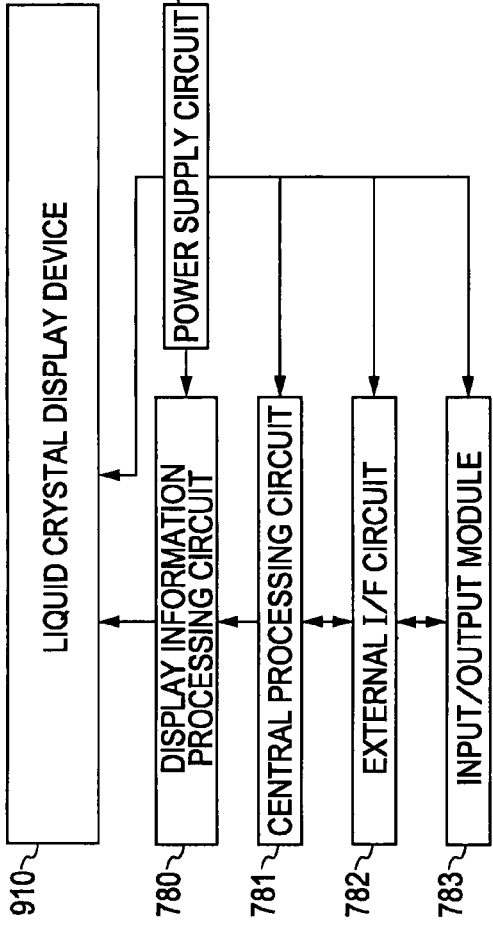
FIG. 8 is a block diagram of an electronic apparatus according to the first embodiment.

FIG. 8 is a block diagram of an electronic apparatus according to the first embodiment. The electronic apparatus includes the liquid crystal display device 910, which is an electro-optical device, a display information processing circuit 780 that controls the device, a central processing circuit 781, an external I/F circuit 782, an input/output module 783, and a power supply circuit 784. The display information processing circuit 780 rewrites image data stored in random access memory (RAM) appropriately on the basis of a command from the central processing circuit 781, and supplies image signals together with timing signals to the liquid crystal display device 910. The central processing circuit 781 carries out various arithmetic operations on the basis of input from the external I/F circuit 782, and outputs commands to the display information processing circuit 780 and the external I/F circuit 782 on the basis of arithmetic operations. The external I/F circuit 782 sends information from the input/output module 783 to the central processing circuit 781 and controls the input/output module 783 on the basis of commands from the central processing circuit 781. Examples of the input/output module 783 include a switch, a keyboard, a hard disk, and a flash memory unit. The power supply circuit 784 supplies predetermined power supply voltages to the individual constituent elements described above.

Specific examples of the electronic apparatus include monitors, TVs, notebook-sized personal computers, PDAs, digital cameras, video cameras, mobile phones, photoviewers, video players, DVD players, and audio players.

As described above, by forming the sensor 1 and A/D conversion circuit 100*a* having the configuration shown in FIG. 1 on the active matrix substrate 101, and fabricating an electro-optical device using the resulting structure, it is possible to produce a high value-added panel. Furthermore, by applying the panel to an electronic apparatus, it is possible to realize an electronic apparatus having high display quality.

Second Embodiment

Figure 9:
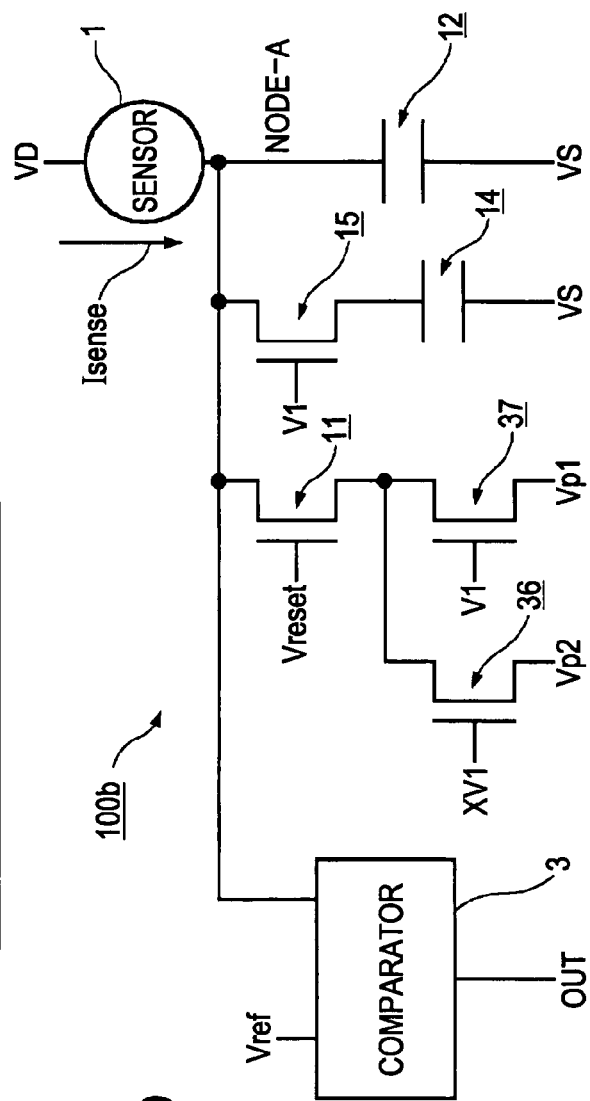
FIG. 9 is a circuit diagram showing a sensor and an A/D conversion circuit according to a second embodiment of the invention.

FIG. 9 is a circuit diagram showing a sensor 1 and an A/D conversion circuit 100*b* according to a second embodiment of the invention. A transistor 11 as a first switching element, a capacitor 12 as a first capacitive element, a capacitor 14 as a second capacitive element, and a transistor 15 as a range-switching circuit have the same structures and operate in the same manner as the elements represented by the same reference numerals in the first embodiment. The total capacitance C1 of the Node-A is 100 fF when V1=VS and 10 pF when V1=VD as in the first embodiment. The channel length and the channel width of each of transistors 36 and 37 are same as those of the transistor 15.

One end of the transistors 36 and 37 are connected via the transistor 11 to the Node-A, the other ends thereof are connected to voltages Vp2 and Vp1, respectively, thus constituting a reset voltage switching circuit that switches the reset voltage in response to a range-switching signal V1. A signal XV1 has a polarity opposite to that of the range-switching signal V1. When V1=VD, XV1=VS; and when V1=VS, XV1=VD. When V1=VS (XV1=VD), the voltage Vp1 is written at the timing in which Vreset=VD. When V1=VD (XV1=VS), the voltage Vp2 is written at the timing in which Vreset=VD.

That is, in this embodiment, equation (13) in the first embodiment is replaced by equation (16).

$$Isense = \frac{C1 \times (Vref - Vp1)}{t' - t0} \quad (16)$$
$$(V1 = VS)$$
$$Isense = \frac{C1 \times (Vref - Vp2)}{t' - t0}$$
$$(V1 = VD)$$

Provided that VD=8 V, Vref=4 V, Vp1=3 V, Vp2=0 V, and the other values and limitations are the same as those in the first embodiment, when V1=VS, the measurable range of the current Isense is from 1 pA to 10 nA; and when V1=VD, the measurable range of the current Isense is from 400 pA to 40 µA. When the ranges in both modes are combined, the measurable Isense range is from 1 pA to 40 µA. That is, the measurement dynamic range is 40,000,000:1. Thus, the measurement dynamic range can be further increased compared with the first embodiment. The application of the circuit to a liquid crystal display device, and others are the same as those in the first embodiment, and a description thereof will be omitted.

Third Embodiment

Figure 10:
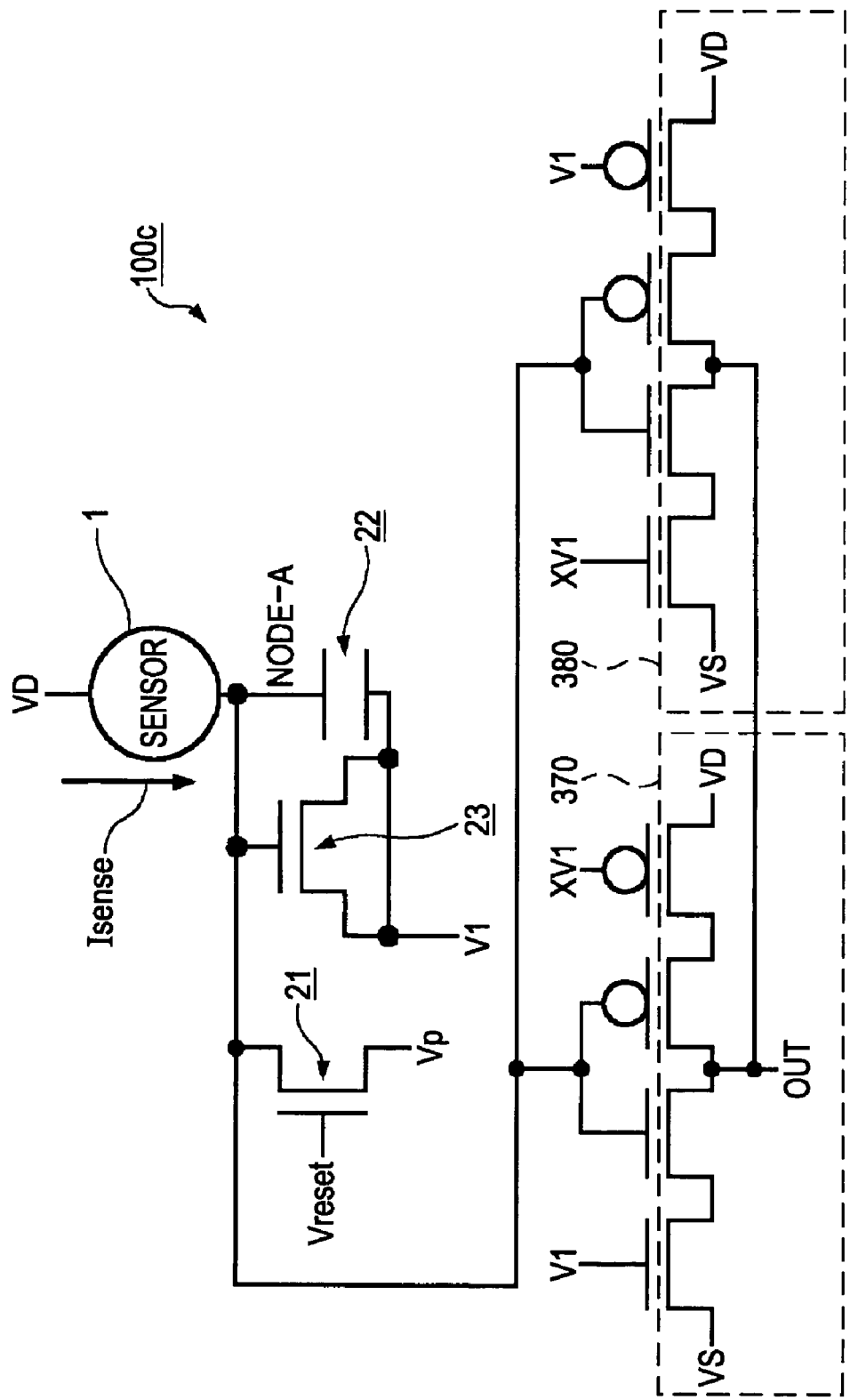
FIG. 10 is a circuit diagram showing a sensor and an A/D conversion circuit according to an example of a third embodiment of the invention.

FIG. 10 is a circuit diagram showing a sensor 1 and an A/D conversion circuit 100c according to a third embodiment of the invention. As a capacitance switching unit which is a range-switching circuit of the Node-A, instead of the structure including the capacitor and the switch shown in the first embodiment or the second embodiment, a field-effect capacitor in which source and drain electrodes of a transistor 23 are short-circuited with each other is used. The source and drain electrodes of the field-effect transistor 23 are connected to a range-switching signal V1. The voltage VA of the Node-A is between an initial voltage Vp and a reference voltage Vref, and VS+Vth<Vp<VD−Vth. Here, Vth is the threshold voltage of the transistor 23. A transistor 21 has a channel width W of 20 µm and a channel length L of 6 µm. The transistor 23 has a channel width W of 2,770 µm and a channel length L of 10 µm. A capacitor 22 has a capacitance of 100 fF.

When V1=VS, Vgs=Vp−VS>Vth, where Vgs is the voltage between the gate and the source of the transistor 23, and the transistor 23 is ON. A channel is formed in a thin-film polysilicon region which overlaps the gate electrode. Provided that the thickness of the gate insulating film is 100 nm and the dielectric constant is 4.0 in the transistor 23, the capacitance between the gate and source/drain of the transistor 23, i.e., between the Node-A and V1, is 9.9 pF. That is, by adding the capacitance of the capacitor 22, the total capacitance between the Node-A and V1 is 10 pF.

When V1=VD, Vgs=Vp−VD<0, where Vgs is the voltage between the gate and the source of the transistor 23, the transistor 23 is OFF, and the thin-film polysilicon region which overlaps the gate electrode has a high resistance. The capacitance between the gate and the source/drain of the transistor 23, i.e., between the Node-A and V1 is substantially zero, and the total capacitance between the Node-A and V1, which includes only the capacitance of the capacitor 22, is 100 fF.

Furthermore, in this embodiment, instead of the comparator circuit 3 used in the first or second embodiment, clocked inverters 370 and 380 are used as a voltage detection unit which is a voltage detection circuit. A signal XV1 has a polarity opposite to that of the range switching signal V1. When V1=VD, XV1=VS. When V1=VS, XV1=VD. That is, when V1=VS, the clocked inverter 380 operates. When V1=VD, the clocked inverter 370 operates. The size of the transistors constituting the clocked inverters 370 and 380 is set so that the operating point V37 of the clocked inverter 370 and the operating point V38 of the clocked inverter 380 satisfy the relationship V38>V37>Vp. Here, the operating point is defined as an input voltage at which the input voltage is equal to the output voltage when a clocked inverter is clocked on. At the operating point, High and Low of the clocked inverter invert each other.

For example, in the clocked inverter 370, the channel width of an N-channel transistor is set at 50 µm and the channel width of a P-channel transistor is set at 10 µm, and in the clocked inverter 380, the channel width of an N-channel transistor is set at 30 µm and the channel width of a P-channel transistor is set at 30 µm so that the clocked inverters 370 and 380 have different channel width ratios. V37=2.5 V and V38=4 V. The threshold voltage Vth of the transistor 23 is about 1 V. VD=8 V, VS=0 V, and Vp=2 V.

In such a case, the change in the voltage VA(t) of the Node-A is the same as that in the first embodiment and is represented by equation (11). When V1=VD, the output signal OUT of the clocked inverter 370 inverts at VA(t)=V37=2.5 V. When this timing is considered as inversion time t', the current Isense is represented by equation (17) (C1=100 fF).

$$Isense = \frac{C1 \times (V37 - Vp)}{t' - t0} \quad (17)$$

When V1=VD, the current Isense is represented by equation (18) (C1'=10 pF).

$$Isense = \frac{C1' \times (V38 - Vp)}{t' - t0} \quad (18)$$

On the basis of the limitations that are the same as those in the first embodiment, provided that 10 µsec<t'−t0<0.1 sec, the measurable Isense range is from 0.5 pA to 2 µA by combining the range when V1=VD and the range when V1=VS. That is, the measurement dynamic range is 4,000,000:1. The application of the circuit to a liquid crystal display device, and others are the same as those in the first embodiment, and a description thereof will be omitted.

Figure 11:
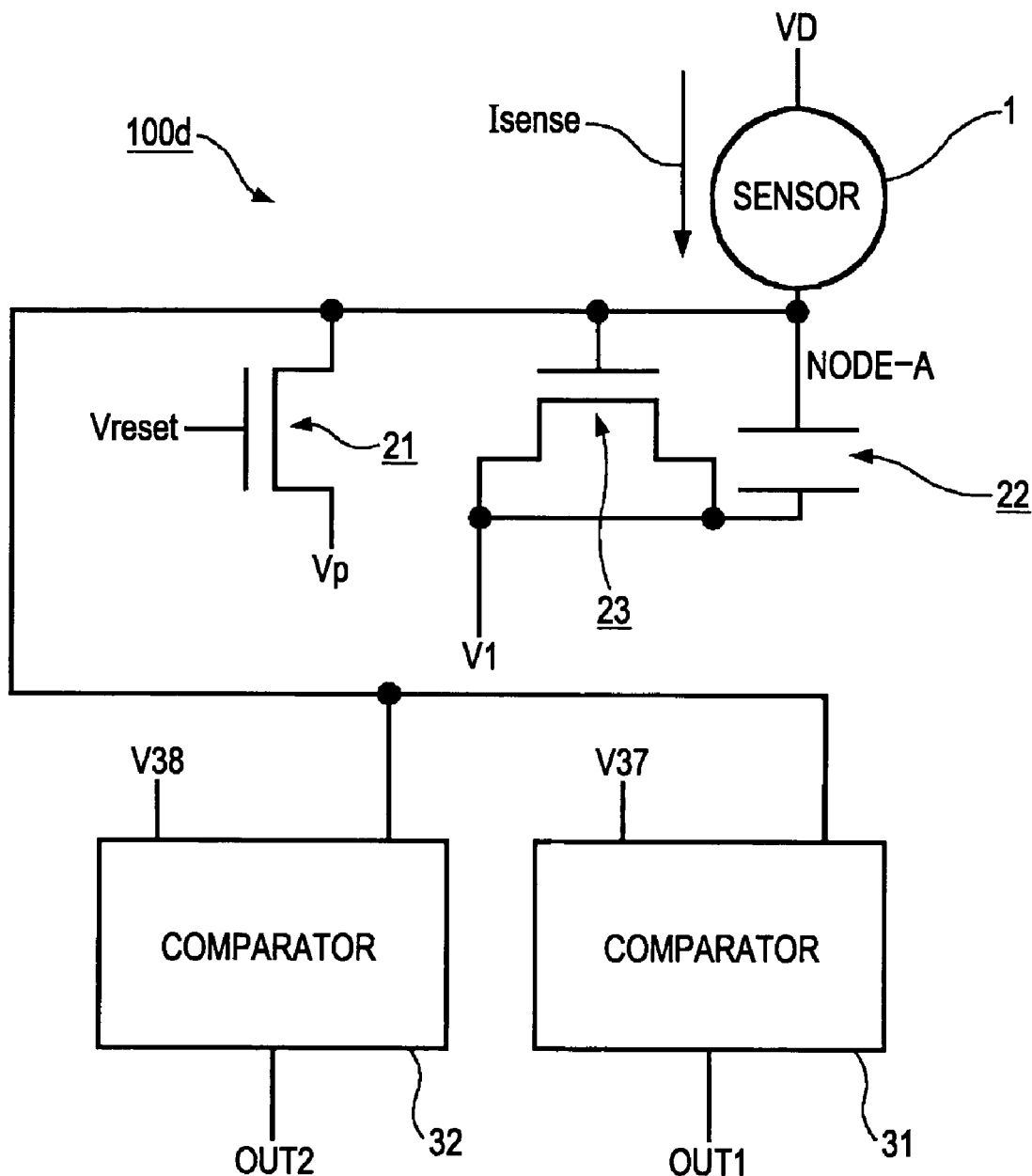
FIG. 11 is a circuit diagram showing a sensor and an A/D conversion circuit according to another example of the third embodiment.

Furthermore, as another example, a configuration shown in FIG. 11 including a sensor 1 and an A/D conversion circuit 100d may be used. In this circuit configuration, two comparator circuits 31 and 32 are provided instead of the clocked inverters 370 and 380. By applying reference voltages V37 (=2.5 V) and V38(=4.0 V), the same operation as that in the example described above is realized. As the specific configuration of each of the comparator circuits 31 and 32, any one of the circuits shown in FIGS. 2, 3, and 13 may be used. In the configuration shown in FIG. 11, because of the use of the comparator circuits, even if the threshold voltage Vth of the transistor varies, the accuracy is not easily degraded compared with the configuration shown in FIG. 10. However, because of an increase in the number of elements, the circuit area increases, which is disadvantageous. Which configuration is to be used may be determined in consideration of the balance.

The invention is not limited to the embodiments, and is applicable to any sensor that converts a measured quantity to a current, in addition to optical sensors and temperature sensors. As the electro-optical device, organic EL displays and the like may be used, besides liquid crystal display devices. As the substrate, in place of a glass substrate, a quartz substrate or a plastic substrate may be used.

Furthermore, the constituent elements of the individual embodiments may be properly combined with each other. For example, in the first embodiment, instead of the comparator 3, the clocked inverters 370 and 380 as used in the third embodiment may be combined. The same applies to the second embodiment.

The number of range-switching signal is not limited to one, but may be two or more. Furthermore, the number of comparators, inverters, or transmission gates may be increased so that A/D conversion can be performed in increased number of gradations.

The entire disclosure of Japanese Patent Application No. 2006-137410, filed May 17, 2006 is expressly incorporated by reference herein.

What is claimed is:

1. An electronic circuit having transistors disposed on a substrate, each transistor including an active layer made of thin-film polysilicon, the electronic circuit comprising:
   a sensor that converts a measured quantity into a current value;
   a current-voltage conversion circuit that converts the current value into a voltage; and
   a voltage detection circuit that detects the voltage converted by the current-voltage conversion circuit and outputs a predetermined signal,
   wherein the current-voltage conversion circuit includes a storage circuit and a range-switching circuit that switches a current-voltage conversion range of the current-voltage conversion circuit by switching the capacitance of the storage circuit between a first capacitance value and a second capacitance value,
   wherein the storage circuit includes a first capacitive element and a second capacitive element connected to the sensor, and the range-switching circuit electrically connects either one or both of the first capacitive element and the second capacitive element to the sensor in response to a range-switching signal,
   wherein the storage circuit includes a capacitive transistor having an active layer made of thin-film polysilicon, the range-switching signal is connected to a source electrode and a drain electrode of the capacitive transistor, and an end of the sensor is connected to a gate electrode of the capacitive transistor.

2. The electronic circuit according to claim 1, wherein the storage circuit further includes a first switching element for writing a reset voltage into the first capacitive element and the second capacitive element at an appropriate timing, and the first switching element is connected to a reset voltage switching circuit that switches the reset voltage in response to the range-switching signal.

3. The electronic circuit according to claim 1, wherein the sensor is a PIN junction diode or a PN junction diode including an active layer made of thin-film polysilicon, the active layer being the same layer as the active layer of the capacitive transistor, and the measured quantity corresponds to a light illuminance.

4. The electronic circuit according to claim 1, wherein the sensor is a resistor including the thin-film polysilicon which is the same as that for the active layer of the capacitive transistor, and the measured quantity corresponds to a temperature.

5. The electronic circuit according to claim 1, wherein the voltage detection circuit includes a plurality of comparator circuits having the same circuit configuration, and different reference voltages are applied to the comparator circuits.

6. The electronic circuit according to claim 1, wherein the voltage detection circuit includes a plurality of CMOS inverters or CMOS clocked inverters, and the CMOS inverters or the CMOS clocked inverters have different ratios of the channel width of an N-channel transistor to the channel width of a P-channel transistor.

7. An electro-optical device comprising the electronic circuit according to claim 1.

8. An electronic apparatus comprising:
   the electro-optical device according to claim 7; and
   a display information processing circuit that processes display information to be displayed on the electro-optical device.

* * * * *